United States Patent
He et al.

(10) Patent No.: US 12,526,398 B2
(45) Date of Patent: Jan. 13, 2026

(54) NAKED-EYE 3D DISPLAY METHOD AND RELATED DEVICE

(71) Applicant: GUANGDONG FUTURE TECHNOLOGY CO., LTD., Shenzhen (CN)

(72) Inventors: Shu He, Shenzhen (CN); Wei Gao, Shenzhen (CN)

(73) Assignee: GUANGDONG FUTURE TECHNOLOGY CO., LTD., Shenzhen (CN)

( * ) Notice: Subject to any disclaimer, the term of this patent is extended or adjusted under 35 U.S.C. 154(b) by 33 days.

(21) Appl. No.: 18/699,337

(22) PCT Filed: Sep. 28, 2022

(86) PCT No.: PCT/CN2022/122083
§ 371 (c)(1),
(2) Date: Oct. 18, 2024

(87) PCT Pub. No.: WO2023/056865
PCT Pub. Date: Apr. 13, 2023

(65) Prior Publication Data
US 2025/0039352 A1    Jan. 30, 2025

(30) Foreign Application Priority Data
Oct. 9, 2021   (CN) .......................... 202111179078.0

(51) Int. Cl.
*H04N 13/359* (2018.01)
*H04N 13/31* (2018.01)
*H04N 13/383* (2018.01)

(52) U.S. Cl.
CPC .......... *H04N 13/359* (2018.05); *H04N 13/31* (2018.05); *H04N 13/383* (2018.05)

(58) Field of Classification Search
None
See application file for complete search history.

(56) References Cited

U.S. PATENT DOCUMENTS

| | | | |
|---|---|---|---|
| 2011/0187764 A1* | 8/2011 | Bae ...................... | G02B 6/0068 345/697 |
| 2012/0020413 A1* | 1/2012 | Chen ...................... | H04N 19/61 375/240.26 |

(Continued)

*Primary Examiner* — Edemio Navas, Jr.
(74) *Attorney, Agent, or Firm* — IPro, PLLC; Na Xu

(57) ABSTRACT

A naked-eye 3D display method and a related device, used to reduce 3D crosstalk and suitable for multi-person watching, and also solving the problem of 2D/3D display switching. The method comprises: a naked-eye 3D display device (300) being 2D/3D switchable and comprising an OLED backlight panel (301) and a display panel (302) which are arranged in parallel at an interval; the backlight panel (301) containing a controllable light-emitting unit array, a light-emitting unit emitting white light or not emitting light; the display panel (302) comprising a liquid crystal display unit array. The naked-eye 3D display device (300) is used to display a three-dimensional image, the three-dimensional image comprising two or more views; when the naked-eye 3D display device (300) is switched to a 2D display mode, light-emitting units provided on the backlight panel (301) emit light, so that a light incident surface of the display panel (302) is uniformly illuminated; and when the naked-eye 3D display device (300) is switched to a 3D display mode, pixels of the two or more views of the three-dimensional image are arranged in a staggered manner on the display panel (302), and the light-emitting units of the backlight panel (301) are alternately arranged in a bright and dark manner.

10 Claims, 3 Drawing Sheets

(56) References Cited

U.S. PATENT DOCUMENTS

2016/0217602 A1* 7/2016 Jiao ........................... G06T 1/20
2018/0107008 A1* 4/2018 Lu ........................... G02B 30/27

* cited by examiner

101 — When the naked-eye 3D display device is switched to the 2D display mode, setting all the light-emitting units of the backlight panel to emit light, such that a light incident surface of the display panel receives uniform light illumination 102 — When the naked-eye 3D display device is switched to the 3D display mode, two or more view pixels of the stereoscopic image are set to be interleaved on the display panel, and the light-emitting units of the backlight panel are arranged in alternating bright and dark stripes

FIG. 1

NAKED-EYE 3D DISPLAY METHOD AND RELATED DEVICE

TECHNICAL FIELD

The present disclosure relates to the technical field of 3D display, and in particular, relates to a naked-eye 3D display method and a related device.

BACKGROUND

The naked-eye 3D technology is based on the parallax of the human eye, that is, when the left and right eyes of a viewer observe the same object, there will be differences in the images. The images seen by the left and right eyes are synthesized in the brain to become 3D content. Therefore, by processing the images on the screen, mapping the images with parallax to the left and right eyes of the person respectively, the images appear as 3D images to the viewer.

In recent years, with the development of science and technology, televisions include cathode ray tube televisions, liquid crystal displays, or the like, and people have more diverse choices in televisions, displays, or applications. However, the displays currently available on the market are all in a two-dimensional (2D) mode, which means that no matter from which angle the viewer view the screen, the images presented are the same. So-called three-dimensional (3D) televisions utilize 3D technology such as stereoscopic capture, multi-view capture, or 2D plus depth, which can provide users with an experience similar to a three-dimensional space. However, 3D televisions only display 3D images, while the displays available on the market only display two-dimensional images.

SUMMARY

Technical Problems

The present application provides a naked-eye 3D display method and a related device, which achieves low crosstalk to a greater extent and solves the problem of switching between the 2D display mode and the 3D display mode.

Solutions to Solve the Problems

Technical Solutions

A first aspect of an embodiment of the present application provides naked-eye 3D display method, applicable to a naked-eye 3D display device, the naked-eye 3D display device is switchable between a 2D display mode and a 3D display mode and comprises a backlight panel and a display panel that are parallelly spaced apart, wherein the backlight panel comprises an array of controllable light-emitting units, each of the light-emitting units emitting white light or not emitting light: the display panel comprises an array of display units: and the naked-eye 3D display device is configured to display a stereoscopic image, wherein the stereoscopic image comprises two or more views: when the naked-eye 3D display device is switched to the 2D display mode, setting all the light-emitting units of the backlight panel to emit light, such that a light incident surface of the display panel receives uniform light illumination: and when the naked-eye 3D display device is switched to the 3D display mode, two or more view pixels of the stereoscopic image are set to be interleaved on the display panel, and the light-emitting units of the backlight panel are arranged in alternating bright and dark stripes.

A second aspect of an embodiment of the present application provides a naked-eye 3D display device switchable between a 2D display mode and a 3D display mode, including: a backlight module and a display panel, wherein the backlight module is configured to supply sufficient and uniformly distributed white light to, and the backlight module comprises a plurality of light source arrays successively spaced apart from each other, each of the light source array comprising a plurality of light-emitting units: wherein, when the naked-eye 3D display device is switched to the 2D display mode, all the light-emitting units of the plurality of light source arrays emit light, such that a light incident surface of the display panel receives uniform light illumination; and when the naked-eye 3D display device is switched to the 3D display mode, a portion of the light-emitting units of the light source arrays emit light, such that the light incident surface of the display panel receives light illumination with alternating brightness and darkness. Left and right picture pixels of the display panel are interleaved in accordance with a regular pattern of brightness and darkness, such that the left picture pixels and the right picture pixels respectively reach the left eye and the right eye, thereby producing a stereoscopic vision.

BENEFICIAL EFFECTS OF THE INVENTION

Beneficial Effects

Compared to the related art, the technical solutions according to the present disclosure are different from traditional active 3D solutions where arrangement of LCD pixels is adjusted to adapt to a raster, and prevent the LCD pixels from being simultaneously horizontally (left-right) divided into during spectral separation. Since arrangement of the pixels of the display panel remains fixed, adjusting arrangement of the bright and dark stripes of the controllable light-emitting unit arrays of the backlight panel avoids the problem of adapting to the light source by means of arrangement of the pixels in traditional active 3D solutions. This reduces 3D crosstalk and is suitable for viewing by multiple viewers, while addressing the issue of switching between the 2D and 3D display modes.

BRIEF DESCRIPTION OF THE DRAWINGS

Description of the Drawings

Figure 2A:
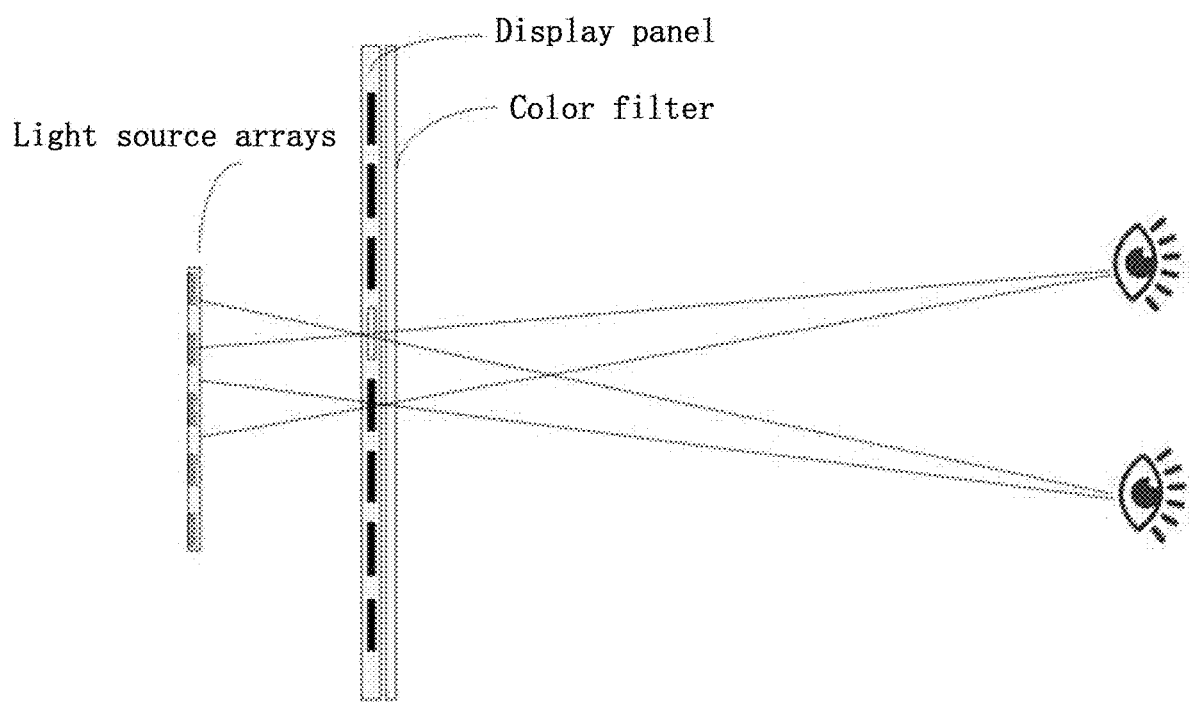
Figure 2B:
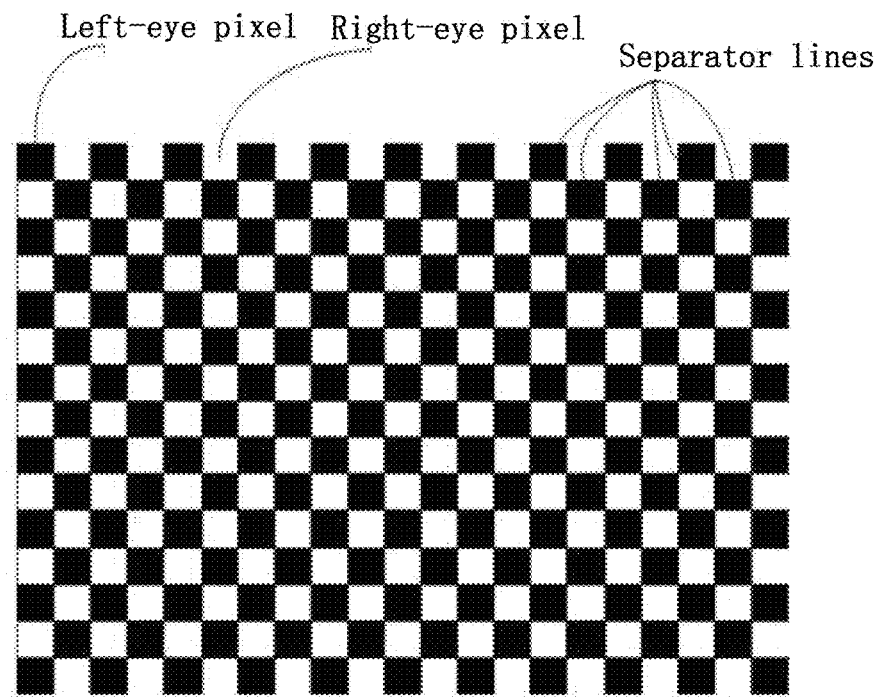
Figure 3:
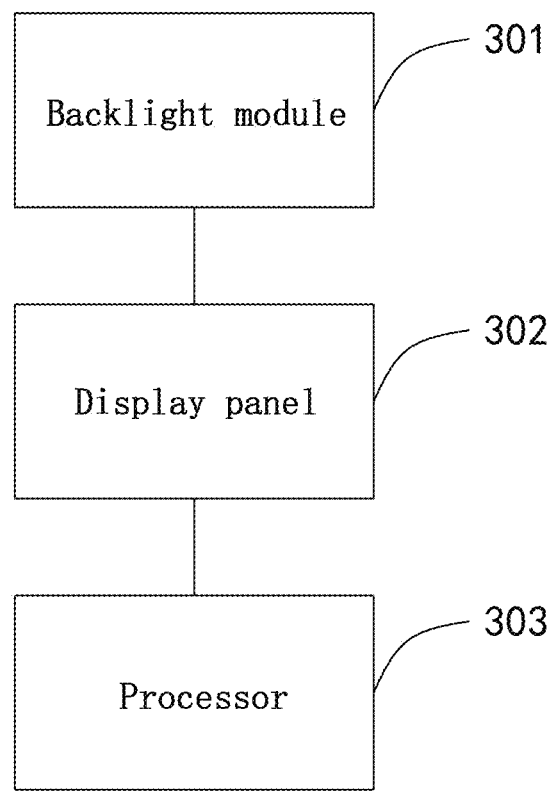

FIG. 1 is a flowchart of a naked-eye 3D display method according to some embodiments of the present disclosure:

FIG. 2A is a schematic diagram of a naked-eye 3D display method according to some embodiments of the present disclosure:

FIG. 2B is a schematic diagram of a possible 3D display mode according to some embodiments of the present disclosure: and FIG. 3 is a schematic structural diagram of a possible naked-eye 3D display device according to some embodiments of the present disclosure.

EMBODIMENTS OF THE INVENTION

Detail Description of the Embodiments

For clearer descriptions of the objectives, technical solutions, and advantages of the present disclosure, the present disclosure is further described with reference to specific embodiments and attached drawings. It should be understood that the specific embodiments described herein are only intended to explain the present disclosure instead of limiting the present disclosure.

Referring to FIG. 1, a flowchart of a naked-eye 3D display method according to some embodiments of the present disclosure is illustrated. The naked-eye 3D display method is applicable to a naked-eye 3D display device. The naked-eye 3D display device is configured to display a stereoscopic image. The method includes the following steps.

In 101, when the naked-eye 3D display device is switched to a 2D display mode, setting all the light-emitting units of the backlight panel to emit light, such that a light incident surface of a display panel of the naked-eye 3D display device receives uniform light illumination.

In 102, when the naked-eye 3D display device is switched to a 3D display mode, two or more view pixels of the stereoscopic image are set to be interleaved on the display panel, and the light-emitting units of the backlight panel are arranged in alternating bright and dark stripes.

In the embodiments of the present disclosure, the naked-eye 3D display device is switchable between the 2D display mode and the 3D display mode and includes the backlight panel and the display panel that are parallelly spaced apart. The backlight panel includes a plurality of arrays of controllable light-emitting units. Each of the light-emitting units emits white light or does not emit light. The display panel includes an array of liquid crystal display units. The stereoscopic image includes two or more views. An orthographic projection each of the liquid crystal display units corresponds to one or more of the arrays of controllable light-emitting units.

When the naked-eye 3D display device is switched to the 2D display mode, all the light-emitting units of the backlight panel are set to emit light, such that a light incident surface of the display panel receives uniform light illumination. That is, when the naked-eye 3D display device operates in the 2D display mode, the 2D display mode is in an ON state, and a light guide plate and corresponding LED light strips on the backlight panel are in an OFF state. Since the backlight panel emits a surface light source, optical properties of the surface light source upon traveling through the light guide plate are still exhibited as properties of the surface light source.

Optionally, the light-emitting units of the light source arrays are OLED self-luminous diodes, and the light-emitting units are electrically controllable.

In practice, movement of a viewer is tracked, and arrangement of the bright and dark stripes of the light-emitting units of the backlight panel is adjusted, such that backlight beams penetrate through the display units and reach left and right eyes of the viewer to generate a stereoscopic vision: wherein adjusting arrangement of the bright and dark stripes of the light-emitting units of the backlight panel includes: extending a horizontal pixel separator line of the display panel and a connection line between midpoints of the left and right eyes to the backlight panel to define a brightness contrast line, and using a midpoint of the bright stripe as a center, decreasing a width of the bright stripe to be between 1:1 and 10:1, and refreshing arrangement of the bright and dark stripes of the backlight panel and increasing a backlight brightness in inverse proportion: an orientation of the stripe is perpendicular to a line connecting the left and right eyes of the viewer; or a left oblique stripe and a right oblique stripe that mutually define an angle are simultaneously included, wherein linear angles formed by the left stripe and the right stripe and the line connecting the left and right eyes of the viewer are opposite angles.

In the embodiments of the present disclosure, when a plurality of viewers are moving simultaneously, to ensure that these viewers all experience a 3D effect, arrangement of the bright and dark stripes of the light-emitting units of the backlight panel is adjusted, and interleaving of a plurality of view pixels of the stereoscopic image is adjusted, such that backlight beams penetrate through the display units and reach left and right eyes of the viewers to generate a stereoscopic vision: wherein adjusting arrangement of the bright and dark stripes of the light-emitting units of the backlight panel includes: extending a horizontal pixel separator line of the display panel and a connection line between midpoints of the left and right eyes to the backlight panel to define a brightness contrast line, and using a midpoint of the bright stripe as a center, decreasing a width of the bright stripe to be between 2:1 and 20:1, and refreshing arrangement of the bright and dark stripes of the backlight panel and increasing a backlight brightness in inverse proportion: an orientation of the stripes is perpendicular to a line connecting the left and right eyes of the viewer.

It should be noted that when one or more viewers are moving, adjusting arrangement of the bright and dark stripes of the light-emitting units of the backlight panel includes: the display panel is a display panel, and the backlight panel is an OLED self-luminous panel: when the naked-eye 3D display device is in the 3D display mode to display the stereoscopic image in a side-by-side format, pixel units of the display panel are equally divided into a left-eye pixel set and a right-eye pixel set, wherein left-eye and right-eye pixel units of the display panel are staggered, the left-eye pixel set and the right-eye pixel set respectively display a left image and a right image: and when the viewer is moving, from a midpoint spatial position of the eyes of the viewer, projecting a plurality of separator lines of left and right pixels of the display panel to a plane of the backlight panel to form interleaved images, decreasing the width of the bright stripe, and meanwhile increasing the backlight brightness in inverse proportion: and arranging the light-emitting units of the backlight panel in accordance with bright and dark configuration of the interleaved images, such that the stereoscopic vision is generated to the eyes of the viewer.

It should be noted that a gap filling layer is further arranged between the light source array and the display panel, wherein the gap filling layer has a thickness of M. $M=L*D/N$, wherein L represents a viewing distance, the viewing distance being a distance from the eyes to the naked-eye 3D display device, D represents a minimum dimension of a pixel indivisible sub-unit, and N represents an interpupillary distance, the interpupillary distance being a real distance between the left and right eyes of the viewer.

Optionally, the two or more view pixels of the stereoscopic image are interleaved on the display panel in a checkerboard or honeycomb grid pattern, which is not limited in the embodiments of the present disclosure.

Optionally, the naked-eye 3D display device according to the embodiments of the present disclosure further includes a color filter, covered on the display panel, such that RGB sub-pixels of the display panel emit light of different colors. Referring to FIG. 2A, a schematic diagram of a naked-eye 3D display method according to some embodiments of the present disclosure is illustrated. The color filter is covered on the display panel, light emitted by the light source array travels through the color filter and the display panel, such that a light incident surface of the display panel receives uniform light illumination and the light reaches the left and right eyes of the viewer. When the naked-eye 3D display device is in a 2D display mode, the light incident surface of the display panel receives uniform illumination. When the naked-eye 3D display device is in a 3D display mode, the two or more view pixels of the stereoscopic image are interleaved on the display panel, and the light-emitting units of the display panel are arranged in alternating bright and dark stripes.

Referring again to FIG. 2B, a schematic diagram of a possible 3D display mode according to some embodiments of the present disclosure. That is, the left eye of the viewer sees left-eye pixels, and the right eye sees right-eye pixels. In this way, a stereoscopic vision is generated to the viewer by parallax of the left and right eyes.

In the embodiments of the present disclosure, OLED white light diodes may be designed to an excessively small size, much smaller than LCD pixel points. Arrangement of bright and dark parts of the OLED backlight panel is adjusted to actively adapt to arrangement of the pixels of the LCD display panel, which is different from the traditional active 3D solutions where arrangement of LCD pixels is adjusted to adapt to the raster, and prevents the LCD pixels from being simultaneously horizontally (left-right) divided into during spectral separation. In this way, the problem of inaccurate spectral separation by the raster is solved, the problem of stray light generated by multiple reflections from the raster is addressed, crosstalk is greatly reduced, generation of moiré patterns is prevented, precise restoration of 3D images is achieved, single-user and multi-user viewing at different resolutions are implemented, and meanwhile the problem of switching between the 2D and 3D display modes is resolved. Furthermore, due to the regularity of OLED brightness and darkness arrangement, the plurality of emitting units may be controlled in parallel. This means that controlling the OLED backlight is equivalent to driving a small-resolution (e.g. 128*256) black-and-white array, thereby eliminating the need for full high-definition (FHD) or higher-resolution graphics drivers.

Some embodiments of the present disclosure further provide a naked-eye 3D display device 300. Referring to FIG. 3, a schematic structural diagram of a naked-eye 3D display device according to some embodiments of the present disclosure is illustrated. The naked-eye 3D display device 300 is switchable between a 2D display mode and a 3D display mode, and includes a backlight module 301 and a display panel 302. The backlight module 301 is configured to supply sufficient and uniformly distributed white light. The backlight module 301 includes a plurality of light source arrays successively spaced apart from each other. Each of the light source array includes a plurality of light-emitting units.

When the naked-eye 3D display device 300 is switched to the 2D display mode, all the light-emitting units of the plurality of light source arrays emit light, such that a light incident surface of the display panel 302 receives uniform light illumination.

When the naked-eye 3D display device 300 is switched to the 3D display mode, a portion of the light-emitting units of the light source arrays emit light, such that the light incident surface of the display panel 302 receives light illumination with alternating brightness and darkness. Left and right picture pixels of the display panel 302 are interleaved in accordance with a regular pattern of brightness and darkness, such that the left picture pixels and the right picture pixels respectively reach the left eye and the right eye, thereby producing a stereoscopic vision.

It should be noted that the naked-eye 3D display device 300 further includes a processor 303. When the naked-eye 3D display device 300 is switched to the 3D display mode to display a left-right stereoscopic image, the processor 303 is configured to evenly divide the pixels of the display panel 302 into a left-eye pixel set and a right-eye pixel set. The left-eye pixel set and the right-eye pixel set are interleaved and respectively display a left image and a right image. The processor 303 is configured to determine spatial positions of the left and right eyes of the viewer, and project a plurality of separator lines of the left and right pixels onto a plane of the light source arrays from midpoints of the eyes of the viewer to form interleaved images, such that the light-emitting units of the light source arrays emit light or do not emit light according to the interleaved images to form interleaved light source surfaces, and a stereoscopic vision is generated to the eyes of the viewer.

Optionally, the naked-eye 3D display device 300 further includes:

a color filter, covered on the display panel 302, such that RGB sub-pixels of the display panel 302 emit light of different colors.

Optionally, the light-emitting units of the light source arrays are OLED self-luminous diodes, and the light-emitting units are electrically controllable.

In summary, it should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of the technical features contained therein. Such modifications or replacements, made without departing from the principles of the present disclosure, shall fall within the scope of the present disclosure.

The invention claimed is:

1. A naked-eye 3D display method, applicable to a naked-eye 3D display device, wherein the naked-eye 3D display device is switchable between a 2D display mode and a 3D display mode and comprises a backlight panel and a display panel that are parallelly spaced apart, wherein the backlight panel comprises an array of controllable light-emitting units, each of the light-emitting units emitting white light or not emitting light; the display panel comprises an array of display units; and the naked-eye 3D display device is configured to display a stereoscopic image, wherein the stereoscopic image comprises two or more views; the method comprising:

when the naked-eye 3D display device is switched to the 2D display mode, setting all the light-emitting units of the backlight panel to emit light, such that a light incident surface of the display panel receives uniform light illumination;

when the naked-eye 3D display device is switched to the 3D display mode, interleaving two or more view pixels of the stereoscopic image on the display panel, and arranging the light-emitting units of the backlight panel in alternating bright and dark stripes;

tracking movement of a viewer, and adjusting arrangement of the bright and dark stripes of the light-emitting units of the backlight panel, such that backlight beams penetrate through the display units and reach left and right eyes of the viewer to generate a stereoscopic vision;

wherein adjusting arrangement of the bright and dark stripes of the light-emitting units of the backlight panel comprises: extending a horizontal pixel separator line of the display panel and a connection line between midpoints of the left and right eyes to the backlight panel to define a brightness contrast line, and using a midpoint of the bright stripe as a center, decreasing a width of the bright stripe to be between 1:1 and 10:1, and refreshing arrangement of the bright and dark stripes of the backlight panel and increasing a backlight brightness in inverse proportion; an orientation of the stripe is perpendicular to a line connecting the left and right eyes of the viewer; or a left oblique stripe and a right oblique stripe that mutually define an angle are simultaneously included, wherein linear angles formed by the left oblique stripe and the right oblique stripe and the line connecting the left and right eyes of the viewer are opposite angles.

2. The method according to claim 1, further comprising:
when a plurality of viewers are moving simultaneously, adjusting arrangement of the bright and dark stripes of the light-emitting units of the backlight panel, such that backlight beams penetrate through the display units and reach left and right eyes of the viewers to generate a stereoscopic vision;
wherein adjusting arrangement of the bright and dark stripes of the light-emitting units of the backlight panel comprises: extending a horizontal pixel separator line of the display panel and a connection line between midpoints of the left and right eyes to the backlight panel to define a brightness contrast line, and using a midpoint of the bright stripe as a center, decreasing a width of the bright stripe to be between 2:1 and 20:1, and refreshing arrangement of the bright and dark stripes of the backlight panel and increasing a backlight brightness in inverse proportion; an orientation of the stripes is perpendicular to a line connecting the left and right eyes of the viewer.

3. The method according to claim 2, wherein adjusting arrangement of the bright and dark stripes of the light-emitting units of the backlight panel comprises:
the backlight panel is an OLED self-luminous panel;
when the naked-eye 3D display device is in the 3D display mode to display the stereoscopic image in a side-by-side format, pixel units of the display panel are equally divided into a left-eye pixel set and a right-eye pixel set, wherein left-eye and right-eye pixel units of the display panel are staggered, the left-eye pixel set and the right-eye pixel set respectively display a left image and a right image; and when the viewer is moving,
from a midpoint spatial position of the eyes of the viewer, projecting a plurality of separator lines of left and right pixels of the display panel to a plane of the backlight panel to form interleaved images, decreasing the width of the bright stripe, and meanwhile increasing the backlight brightness in inverse proportion; and
arranging the light-emitting units of the backlight panel in accordance with bright and dark configuration of the interleaved images, such that the stereoscopic vision is generated to the eyes of the viewer.

4. The method according to claim 1, wherein adjusting arrangement of the bright and dark stripes of the light-emitting units of the backlight panel comprises:
the backlight panel is an OLED self-luminous panel;
when the naked-eye 3D display device is in the 3D display mode to display the stereoscopic image in a side-by-side format, pixel units of the display panel are equally divided into a left-eye pixel set and a right-eye pixel set, wherein left-eye and right-eye pixel units of the display panel are staggered, the left-eye pixel set and the right-eye pixel set respectively display a left image and a right image; and when the viewer is moving,
from a midpoint spatial position of the eyes of the viewer, projecting a plurality of separator lines of left and right pixels of the display panel to a plane of the backlight panel to form interleaved images, decreasing the width of the bright stripe, and meanwhile increasing the backlight brightness in inverse proportion; and
arranging the light-emitting units of the backlight panel in accordance with bright and dark configuration of the interleaved images, such that the stereoscopic vision is generated to the eyes of the viewer.

5. The method according to claim 1, wherein a gap filling layer is further arranged between the light source array and the display panel, wherein the gap filling layer has a thickness of M,
$M=L*D/N$, wherein L represents a viewing distance, the viewing distance being a distance from the eyes to the naked-eye 3D display device, D represents a minimum dimension of a pixel indivisible sub-unit, and N represents an interpupillary distance, the interpupillary distance being a real distance between the left and right eyes of the viewer.

6. The method according to claim 1, wherein the two or more view pixels of the stereoscopic image are interleaved on the display panel in a checkerboard or honeycomb grid pattern.

7. A naked-eye 3D display device switchable between a 2D display mode and a 3D display mode, comprising: a backlight module and a display panel, wherein the backlight module is configured to supply uniformly distributed white light, and the backlight module comprises a plurality of light source arrays successively spaced apart from each other, each of the light source array comprising a plurality of light-emitting units;
wherein
when the naked-eye 3D display device is switched to the 2D display mode, all the light-emitting units of the plurality of light source arrays emit light, such that a light incident surface of the display panel receives uniform light illumination; and
when the naked-eye 3D display device is switched to the 3D display mode, a portion of the light-emitting units of the light source arrays emit light, such that the light incident surface of the display panel receives light illumination with alternating brightness and darkness, left and right picture pixels of the display panel are interleaved in accordance with a regular pattern of brightness and darkness, such that the left picture pixels and the right picture pixels respectively reach the left eye and the right eye, thereby producing a stereoscopic vision;
a gap filling layer is further arranged between the light source array and the display panel, wherein the gap filling layer has a thickness of M,
$M=L*D/N$, wherein L represents a viewing distance, the viewing distance being a distance from the eyes to the naked-eye 3D display device, D represents a minimum dimension of a pixel indivisible sub-unit, and N represents an interpupillary distance, the interpupillary distance being a real distance between the left and right eyes of the viewer.

8. The naked-eye 3D display device according to claim 7, further comprising: a processor; wherein
when the naked-eye 3D display device is in the 3D display mode to display the stereoscopic image in a side-byside format, pixel units of the display panel are equally divided into a left-eye pixel set and a right-eye pixel set, wherein left-eye and right-eye pixel units of the display panel are interleaved, the left-eye pixel set and the right-eye pixel set respectively display a left image and a right image; and when the viewer is moving, the processor is configured to determine spatial positions of the left and right eyes of the viewer, and project a plurality of separator lines of the left and right pixels onto a plane of the light source arrays from midpoints of the eyes of the viewer to form interleaved images, such that the light-emitting units of the light source arrays emit light or do not emit light according to the interleaved images to form interleaved light source surfaces, and a stereoscopic vision is generated to the eyes of the viewer.

9. The naked-eye 3D display device according to claim 7, further comprising: an eye tracking unit, configured to calculate in real time an eye spatial position and a viewing distance.

10. The naked-eye 3D display device according to claim 7, further comprising:

a color filter, covered on the display panel, such that RGB sub-pixels of the display panel emit light of different colors.

* * * * *